May 21, 1929.  J. C. GIPE  1,714,307
SHEET GLASS SURFACING APPARATUS
Filed Aug. 18, 1926
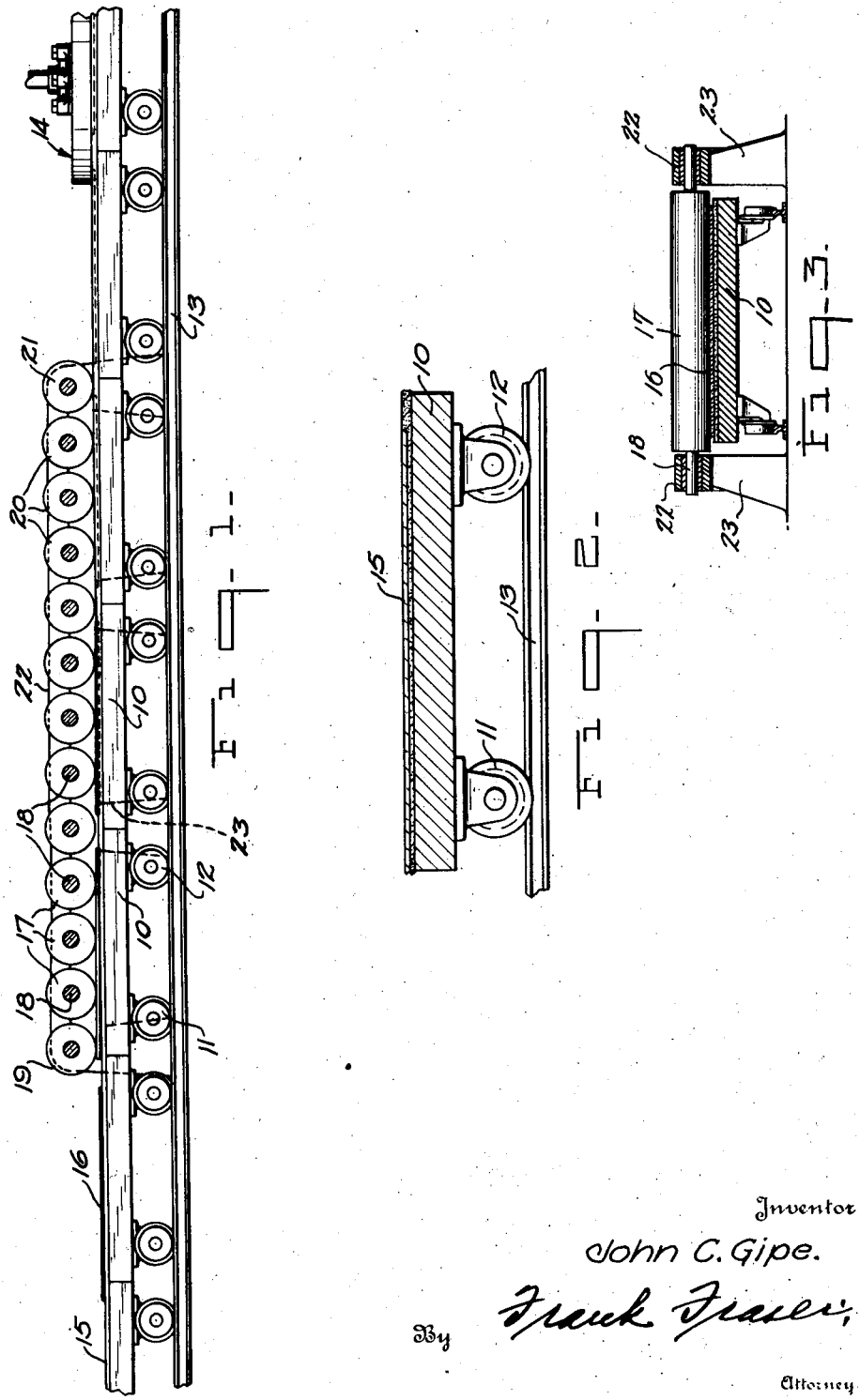
Inventor
John C. Gipe.
By Frank Fraser,
Attorney Patented May 21, 1929.

1,714,307

UNITED STATES PATENT OFFICE.

JOHN C. GIPE, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-SURFACING APPARATUS.

Application filed August 18, 1926. Serial No. 129,890.

This invention relates to improvements in the art of sheet glass manufacture, and more particularly to a novel and simplified apparatus designed primarily for use in connection with what is commonly termed the continuous process for surfacing glass.

It will be understood that in the continuous process, or in other words that process whereby the surfacing of the glass may be continuously pursued, the glass sheets are mounted upon suitable tables or conveyors for carrying the glass beneath successive surfacing units, reversing the sheets and surfacing the second side.

Prior to the present invention various methods have been employed for mounting the glass sheets upon the tables or conveyors before subjecting them to the action of the surfacing units. However, these methods have not proven entirely satisfactory, and contain several distinct disadvantages, one being that in the practice of such methods it is customary to press down first one end of the glass and then the opposite end thereof, and in the practice of these methods as the glass is pressed downwardly at one end, the opposite end will have the tendency to kick up with the result that the sheet will not be evenly set. Again, a plurality of sheets are usually mounted end to end on a number of tables, and with the methods now commonly employed, the various sheets are not apt to be evenly set relative to one another. In other words, one sheet is very likely to be a little higher or a little lower than the adjacent sheet.

The present invention has been provided for overcoming the above disadvantages, and an important object thereof is to provide new and novel means for pressing the glass sheet so that any danger of the sheet kicking up or buckling is reduced to a minimum.

Another object of the present invention is to provide improved means of the above character for applying to the sheet throughout its entire length an even and uniform pressure.

Another object of the present invention is the provision of improved means of the above character for gradually pressing the glass sheet downwardly into a plastic material until it is in a predetermined position.

Another object of the present invention is the provision of means wherein the various glass sheets will be set in exactly the same horizontal plane relative to one another.

A further object of the present invention is the provision of improved means of the above character, embodying a plurality of pressing instrumentalities and means for moving a sheet of glass in a definite horizontal path beneath the said pressing instrumentalities.

Numerous other objects and advantages of the present invention will become more readily apparent during the course of the following description when taken in connection with the accompanying drawings.

In the drawings:

Fig. 1 is a diagrammatic view of the present invention showing the positions of the pressing instrumentalities relative to the glass supporting tables.

Fig. 2 is a vertical longitudinal sectional view through one of the supporting tables, and Fig. 3 is a transverse section showing the mounting for the pressing instrumentalities or rollers.

Referring now more in detail to the accompanying drawings, it will be seen that in carrying the present invention into practice, there is provided a plurality of horizontal supporting tables 10, and any suitable means may be provided for securing the adjacent ends of these tables together. The tables may be of any desired size and construction, and are supported at their opposite ends by means of supporting wheels 11 and 12 which run upon rails 13. The tables 10 are adapted to carry the glass sheets in a definite horizontal path beneath a series of surfacing units, one of which is generally designated by the numeral 14.

When securing the glass sheets to the tables, a sufficient amount of suitable plastic material, indicated at 15, is first placed upon the tables, after which the glass sheets 16 are placed upon the plastic material.

Positioned above the tables 10, in advance of the surfacing units 14 and in a substantial horizontal line therewith, are a plurality of pressing instrumentalities or rollers 17. These rollers extend transversely of the tables and are mounted upon shafts 18 journaled at their opposite ends in bearings 22 carried by standards 23. A number of rollers sufficient to cover a plurality of tables are preferably employed, and these rollers are arranged in an inclined plane, with the end roller 19 remote from the surfacing units 14, being positioned furtherest away from the table 10. A number of rollers 20, sufficient to cover at least one table and mounted in the same manner as rollers 17, are arranged in a horizontal plane immediately adjacent the rollers 17. The end roller 21, adjacent the surfacing units, is spaced therefrom a distance sufficient to allow the plastic material to set before the glass sheet is subjected to the action of the surfacing units.

Thus, the glass sheet is first secured to the table in the manner above stated, after which the tables are run under the rollers towards the surfacing units. It will therefore be appreciated that as the glass sheet comes first into contact with the roller 19 and subsequently into successive contact with the other rollers, that the same will be gradually pressed downwardly into the plastic material. The provision of the rollers 20 in a horizontal plane is one of the important features of the present invention in that these rollers will give a uniform pressure throughout the entire length of the glass sheet, thereby effectively preventing the kicking up of either end of the sheet and the buckling thereof during the pressing operation. Also, due to the fact that the rollers 20 are mounted on fixed adjustable shafts, the same amount of pressure will be applied to each sheet so that the various sheets, after being pressed, will be in the same horizontal plane relative to one another.

From the foregoing, it is believed that the advantages to be derived from the present invention will be readily apparent, and it is to be understood that changes in details of construction may be resorted to without departing from or sacrificing the spirit of the invention as long as such changes fall within the scope of the appended claims.

Claims:

1. In a machine for mounting glass sheets which are to be surfaced, a bed upon which the glass is adapted to be mounted, a layer of plastic material on said bed and upon which the glass initially rests, means for moving the bed in a horizontal path, and a plurality of pressing instrumentalities arranged with their pressing surfaces in an inclined plane and adapted to press the glass into the said plastic material.

2. In a machine for mounting glass sheets which are to be surfaced, a bed upon which the glass is adapted to be mounted, a layer of plastic material on said bed and upon which the glass initially rests, means for moving the bed in a horizontal path, and a plurality of rotatable pressing instrumentalities arranged with their pressing surfaces in an inclined plane and adapted to press the glass into the said plastic material.

3. In a machine for mounting glass sheets which are to be surfaced, a bed upon which the glass is adapted to be mounted, a layer of plastic material on said bed and upon which the glass initially rests, means for moving the bed in a horizontal path, and a plurality of freely rotatable cylindrical members disposed transversely of said bed, the bottoms of the peripheries of said members being arranged in an inclined plane and adapted to press the glass into the said plastic material.

4. In a machine for mounting glass sheets which are to be surfaced, a bed upon which the glass is adapted to be mounted, a layer of plastic material on said bed and upon which the glass initially rests, means for moving the bed in a horizontal path, a plurality of pressing instrumentalities arranged with their pressing surfaces in an inclined plane and adapted to press the glass into the said plastic material, and a plurality of additional pressing instrumentalities arranged with their pressing surfaces in a horizontal plane and adapted to engage the glass subsequent to the engagement therewith of said first mentioned pressing instrumentalities.

5. In a machine for mounting glass sheets which are to be surfaced, a bed upon which the glass is adapted to be mounted, a layer of plastic material on said bed and upon which the glass initially rests, means for moving the bed in a horizontal path, a plurality of rotatable pressing instrumentalities arranged with their pressing surfaces in an inclined plane and adapted to press the glass into the said plastic material, and a plurality of additional rotatable pressing instrumentalities arranged with their pressing surfaces in a horizontal plane and adapted to engage the glass subsequent to the engagement therewith of said first mentioned pressing instrumentalities.

6. In a machine for mounting glass sheets which are to be surfaced, a bed upon which the glass is adapted to be mounted, a layer of plastic material on said bed and upon which the glass initially rests, means for moving the bed in a horizontal path, a plurality of freely rotatable cylindrical members disposed transversely of said bed, the bottoms of the peripheries of said members being arranged in an inclined plane and adapted to press the glass into the said plastic material, and a plurality of additional freely rotatable cylindrical members arranged with the bottoms of their peripheries in a horizontal plane and adapted to engage the glass subsequent to the engagement therewith of said first mentioned cylindrical members.

Signed at Toledo, in the county of Lucas and State of Ohio, this 16th day of August, 1926.

JOHN C. GIPE.